(12) United States Patent
Bethard et al.

(10) Patent No.: US 10,394,950 B2
(45) Date of Patent: Aug. 27, 2019

(54) GENERATION OF A GRAMMATICALLY DIVERSE TEST SET FOR DEEP QUESTION ANSWERING SYSTEMS

(71) Applicant: International Business Machines Corporation, Armonk, NY (US)

(72) Inventors: Sean L. Bethard, Centreville, VA (US); Edward G. Katz, Washington, DC (US); Christopher Phipps, Arlington, VA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/242,807

(22) Filed: Aug. 22, 2016

(65) Prior Publication Data
US 2018/0052818 A1 Feb. 22, 2018

(51) Int. Cl.
*G06F 17/27* (2006.01)
*G06F 16/35* (2019.01)
(Continued)

(52) U.S. Cl.
CPC ........ *G06F 17/271* (2013.01); *G06F 16/3329* (2019.01); *G06F 16/3344* (2019.01); *G06F 16/35* (2019.01); *G06F 17/2785* (2013.01)

(58) Field of Classification Search
CPC ...... G06F 17/27; G06F 17/20; G06F 17/2705; G06F 17/271; G06F 17/2715;
(Continued)

(56) References Cited

U.S. PATENT DOCUMENTS 5,841,895 A 11/1998 Huffman
6,112,168 A * 8/2000 Corston ................ G06F 17/274
704/9
(Continued)

OTHER PUBLICATIONS

Carmel, David, et al., "Improving Term Weighting for Community Question Answering Search Using Syntactic Analysis", Proc. 23rd ACM Int'l. Conf. on Information and Knowledge Management, pp. 351-360 (2014).

(Continued)

*Primary Examiner* — Lamont M Spooner
(74) *Attorney, Agent, or Firm* — Diana R. Gerhardt; Jack V. Musgrove

(57) ABSTRACT

A grammatically diverse test set of natural language sentences for a deep question answering system is provided by analyzing a given sentence to characterize its syntactical classification, and adding the sentence to the test set if its classification is sufficiently different from other sentences already in the test set. A particular sentence may be selected for inclusion according to a desired syntactic distribution. Multiple sentences having the exact same classification may be allowed subject to a maximum number of such sentences. The test set is adapted to an element of interest by characterizing each syntactical classification relative to the element of interest. The analysis derives a parse tree, identifies a particular node of the tree corresponding to the element of interest, and extracts syntactic information by traversing the tree starting at the particular node and ending at the root node of the tree according to different traversal schemes.

18 Claims, 6 Drawing Sheets

(51) Int. Cl.
*G06F 16/33* (2019.01)
*G06F 16/332* (2019.01)

(58) Field of Classification Search
CPC .. G06F 17/272; G06F 17/2725; G06F 17/273; G06F 17/2735; G06F 17/274; G06F 17/2745; G06F 17/275; G06F 17/2755; G06F 17/276; G06F 17/2765; G06F 17/2795
USPC .................................................. 704/1, 9, 10
See application file for complete search history.

(56) References Cited

U.S. PATENT DOCUMENTS

| | | | | |
|---|---|---|---|---|
| 6,275,792 | B1* | 8/2001 | Lewis | G06F 17/2705 704/255 |
| 6,965,857 | B1 | 11/2005 | Decary | |
| 7,890,539 | B2 | 2/2011 | Boschee et al. | |
| 8,229,970 | B2* | 7/2012 | Walters | G06F 17/30625 707/802 |
| 8,433,715 | B1* | 4/2013 | Mirhaji | G06F 17/30312 707/756 |
| 8,515,736 | B1* | 8/2013 | Duta | G10L 15/1822 704/9 |
| 8,719,005 | B1 | 5/2014 | Lee et al. | |
| 8,856,096 | B2* | 10/2014 | Marchisio | G06F 17/30731 707/706 |
| 9,015,031 | B2 | 4/2015 | Ferrucci et al. | |
| 9,026,529 | B1* | 5/2015 | Osofsky | G06F 17/30864 702/181 |
| 9,110,977 | B1 | 8/2015 | Pierre et al. | |
| 9,317,814 | B2* | 4/2016 | Byron | G06N 99/005 |
| 9,473,637 | B1* | 10/2016 | Venkatapathy | H04M 3/5175 |
| 9,613,024 | B1* | 4/2017 | Zhang | G06F 17/2785 |
| 2002/0133347 | A1* | 9/2002 | Schoneburg | G06F 17/27 704/257 |
| 2003/0130976 | A1* | 7/2003 | Au | G06F 17/27 706/55 |
| 2003/0191627 | A1* | 10/2003 | Au | G06F 17/2785 704/9 |
| 2004/0225667 | A1* | 11/2004 | Hu | G06F 17/30719 |
| 2006/0253274 | A1* | 11/2006 | Miller | G06F 17/278 704/9 |
| 2007/0122774 | A1 | 5/2007 | Wang | |
| 2007/0136336 | A1* | 6/2007 | Shanahan | G06F 17/30705 |
| 2007/0250306 | A1* | 10/2007 | Marcu | G06F 17/2827 704/9 |
| 2007/0260450 | A1* | 11/2007 | Sun | G06F 17/30625 704/9 |
| 2007/0282814 | A1* | 12/2007 | Gupta | G06F 17/27 |
| 2009/0171661 | A1 | 7/2009 | Jayadeva et al. | |
| 2009/0228263 | A1* | 9/2009 | Kamatani | G06F 17/2809 704/4 |
| 2010/0063799 | A1 | 3/2010 | Jamieson | |
| 2011/0238408 | A1* | 9/2011 | Larcheveque | G06F 17/2785 704/9 |
| 2011/0238409 | A1* | 9/2011 | Larcheveque | F06F 17/2785 704/9 |
| 2011/0238410 | A1* | 9/2011 | Larcheveque | G06F 17/2785 704/9 |
| 2011/0320187 | A1* | 12/2011 | Motik | G06F 17/278 704/9 |
| 2012/0078889 | A1 | 3/2012 | Chu-Carroll et al. | |
| 2012/0109637 | A1* | 5/2012 | Merugu | G06F 17/30864 704/9 |
| 2012/0259807 | A1* | 10/2012 | Dymetman | G06F 17/18 706/50 |
| 2013/0018649 | A1 | 1/2013 | Deshmukh et al. | |
| 2013/0041652 | A1 | 2/2013 | Zuev et al. | |
| 2013/0282735 | A1* | 10/2013 | Pedersen | G06F 17/30289 707/748 |
| 2014/0163955 | A1* | 6/2014 | Ng Tari | G06F 17/2785 704/9 |
| 2014/0163962 | A1* | 6/2014 | Castelli | G06F 17/2715 704/9 |
| 2014/0236578 | A1 | 8/2014 | Malon et al. | |
| 2014/0249798 | A1 | 9/2014 | Sun et al. | |
| 2014/0289173 | A1* | 9/2014 | Byron | G06Q 10/00 706/12 |
| 2014/0337306 | A1* | 11/2014 | Gramatica | G06F 17/30731 707/706 |
| 2015/0058349 | A1 | 2/2015 | Ramnani et al. | |
| 2015/0106704 | A1* | 4/2015 | Towle | G06F 3/0481 715/271 |
| 2015/0127323 | A1* | 5/2015 | Jacquet | G06F 17/271 704/9 |
| 2015/0269932 | A1 | 9/2015 | Evanini et al. | |
| 2015/0294026 | A1* | 10/2015 | Iskander | G06F 17/30958 707/798 |
| 2015/0379993 | A1 | 12/2015 | Subhojit et al. | |
| 2016/0041980 | A1 | 2/2016 | Mungi et al. | |
| 2016/0140123 | A1 | 5/2016 | Chang et al. | |
| 2016/0170972 | A1* | 6/2016 | Andrejko | G06F 17/2735 704/9 |
| 2016/0283463 | A1* | 9/2016 | M R | G06F 17/2785 |
| 2017/0200081 | A1 | 7/2017 | Allen et al. | |
| 2018/0004730 | A1 | 1/2018 | Qui et al. | |
| 2018/0046610 | A1 | 2/2018 | Vogel et al. | |
| 2018/0190289 | A1 | 7/2018 | Subhojit et al. | |

OTHER PUBLICATIONS

Khoo, Anthony, et al., "Experiments with Sentence Classification", Proc. Australasian Language Technology Workshop, pp. 18-25 (2006).

Post, Matt, et al., "Explicit and Implicit Syntactic Features for Text Classification", Proc. 51st Annual Meeting of the Association for Computational Linguistics, pp. 866-872 (2013).

Moschitti, Alessandro, "Kernel Methods, Syntax and Semantics for Relational Text Categorization", Proc. 17th ACM Conf. on Information and Knowledge Management, pp. 253-262 (2008).

\* cited by examiner

GENERATION OF A GRAMMATICALLY DIVERSE TEST SET FOR DEEP QUESTION ANSWERING SYSTEMS

CROSS-REFERENCE TO RELATED APPLICATION

This application is related to U.S. patent application Ser. No. 15/242,779 entitled "SYNTACTIC CLASSIFICATION OF NATURAL LANGUAGE SENTENCES WITH RESPECT TO A TARGETED ELEMENT" filed concurrently herewith, which is hereby incorporated.

BACKGROUND OF THE INVENTION

Field of the Invention

The present invention generally relates to natural language computing, and more particularly to a method of characterizing the grammatical diversity of a set of natural language sentences.

Description of the Related Art

As interactions between users and computer systems become more complex, it becomes increasingly important to provide a more intuitive interface for a user to issue commands and queries to a computer system. As part of this effort, many systems employ some form of natural language processing. Natural language processing (NLP) is a field of computer science, artificial intelligence, and linguistics concerned with the interactions between computers and human (natural) languages. Many challenges in NLP involve natural language understanding, that is, enabling computers to derive meaning from human or natural language input, and others involve natural language generation allowing computers to respond in a manner familiar to a user. For example, a non-technical person may input a natural language question to a computer system, and the system intelligence can provide a natural language answer which the user can hopefully understand. Examples of an advanced computer systems that use natural language processing include virtual assistants, Internet search engines, and deep question answering systems such as the Watson™ cognitive technology marketed by International Business Machines Corp.

Deep question answering systems can identify passages from text documents (corpora) and analyze them in various ways in order to extract answers relevant to a query; answers can be scored on a number of factors, and the highest score indicates the "best" answer. Models for scoring and ranking the answer are trained on the basis of large sets of question and answer pairs.

One method of analyzing a natural language sentence is to construct a parse tree for the sentence. As the name suggests, a parse tree is a tree-like construct having branches and nodes (including a root node, interior or non-terminal nodes, and leaf or terminal nodes) whose arrangement and elements reflect the syntax of the input language. Syntax generally pertains to rules that govern the structure of sentences, particularly word order. Syntax is one set of rules that make up the grammar of a language. Grammar includes additional rules such as morphology and phonology.

There are different kinds of parse trees including constituency-based parse trees and dependency-based parse trees. FIG. 1 illustrates an example of a constituency-based parse tree 2 for the sentence "Which city's team did New York beat in Superbowl III". According to a conventional analysis, elements of the sentence (i.e., words as well as other morphemes, or linguistic units) are placed at terminal nodes of the tree with a linguistic identifier, e.g., "N" for noun, "NP" for noun phrase, "V" for verb, "VP" for verb phrase, "P" for preposition, "PP" for prepositional phrase, "D" for determiner (e.g., the definite article "the"), "Aux" for auxiliary, "Adj" for adjective, etc. The root node (as well as some interior nodes) can be labeled "S" for sentence. Labels can also include a numeric index which points to a semantic argument of another element. For example, in FIG. 1 the phrase "Which city's team" is a noun phrase with a "1" index as it is one of the semantic arguments for the verb "beat".

Much prior art involves categorizing sentences on the basis of particular words or phrases in a sentence, not a full syntactic parse. Typically these methods involve classifying a sentence into one of a small set of classes defined a priori. For example, in the approach outlined in the article "Experiments with Sentence Classification" by Khoo et al., *Proceedings of the 2006 Australasian Language Technology Workshop*, pp. 18-25 (2006), sentences are classified into one of fourteen different classes, corresponding to rhetorical status (for example: APOLOGY, REQUEST, STATEMENT, THANKING, etc.). The classification is achieved by applying machine learning techniques (Bayesian learning, decision tree classifiers, and support vector machines) to a set of "bag of words" features derived from the words in the sentence. In another approach from "Explicit and Implicit Syntactic Features for Text Classification" by Post et al. in *Proceedings of the 51st Annual Meeting of the Association for Computational Linguistics*, pp. 866-872 (2013), sentences are classified based on pieces of the syntactic parse of a sentence (the "productions used"—essentially the mother-daughter relations in the parse tree). The counts of these productions are used as features in a standard machine-learning set up, and a number of sentence-classification tasks are experimented with. One of these is classification of a set of questions, with the class being the semantic type of a correct answer.

SUMMARY OF THE INVENTION

The present invention in at least one embodiment is generally directed to providing a test set of natural language sentences for a deep question answering system by receiving a plurality of natural language sentences in computer-readable form, analyzing the natural language sentences to characterize different syntactical classifications of the sentences, selecting a subset of the natural language sentences according to a desired syntactic distribution based on the different syntactical classifications, and storing the selected subset as the test set. The selection can include a determination that a syntactical classification for a candidate natural language sentence is different from syntactical classifications of other natural language sentences already in the subset according to at least one predetermined similarity criterion and, responsive to this determination, adding the candidate natural language sentence to the subset. The selection can provide a predetermined minimum number of differently classified sentences in the subset, as well as allow multiple sentences having the exact same syntactical classification in the subset subject to a predetermined maximum number. The test set can be adapted to an element of interest by characterizing each syntactical classification relative to a location of the element of interest in a respective one of the natural language sentences. This adaptation can include parsing a given one of the natural language sentences to derive a parse tree having a plurality of nodes, identifying a particular one of the nodes that corresponds to the element of interest, extracting syntactic information from the parse tree relative to particular node corresponding to the element of interest, and recording the syntactic information as the classification. The test set can then be used to evaluate the deep question answering system.

The above as well as additional objectives, features, and advantages in the various embodiments of the present invention will become apparent in the following detailed written description.

BRIEF DESCRIPTION OF THE DRAWINGS

The present invention may be better understood, and its numerous objects, features, and advantages of its various embodiments made apparent to those skilled in the art by referencing the accompanying drawings.

The use of the same reference symbols in different drawings indicates similar or identical items.

DESCRIPTION OF THE PREFERRED EMBODIMENT(S)

Deep question answering systems can be adapted to a particular domain by training with a large set of questions and answers related to the domain. In this process, it is important that the training set be diverse in order to avoid overfitting, resulting in poor predictive performance (overfitting refers to a model for a system that results more in random noise rather than the underlying relationship). In particular it is useful to have a training set that, in relation to the aspects of the sentence relevant to answering the question, is grammatically diverse. One crucial factor in this regard is the syntactic similarity between the sentence from which the answer is extracted and the question. Training a system with a set of questions of the same syntactic form is detrimental to the operation of the system. Hundreds of questions of the same syntactic form (e.g. "Who won Superbowl III?", and "Who invented the light bulb?") will not contribute as significantly to the ability of a system to answer a variety of other question types (e.g., "Which team did Green Bay lose to in Superbowl III?", or "What was the year in which Thomas Jefferson invented the lightbulb?").

In light of the foregoing, it would be desirable to devise an improved method of syntactically classifying natural language sentences. It would be further advantageous if the method could be used to provide a training set of natural language sentences which is grammatically diverse. Some embodiments of the present invention achieve these and other advantages by automatically classifying sentences on the basis of their grammatical structure with respect to a distinguished element. The classification can use syntactic relationships in the sentence as well as semantic relationships. In an illustrative implementation, a natural language sentence is first analyzed to generate a full syntactic parse tree, and a node of the parse tree is identified as the designated element. The parse tree is traversed according to a traversal scheme while recording the steps of the traversal, i.e., information about the nodes traversed. The traversal scheme may be simpler such as from the designated element directly toward the root of the tree, or variations may be applied to enhance the traversal scheme. The record of the steps can then be returned as a classification of the input sentence. The present invention thereby allows developers of natural language processing systems to automatically quantify the syntactic and semantic diversity of natural language training data in a way closely tied to how the data will be used.

Figure 2:
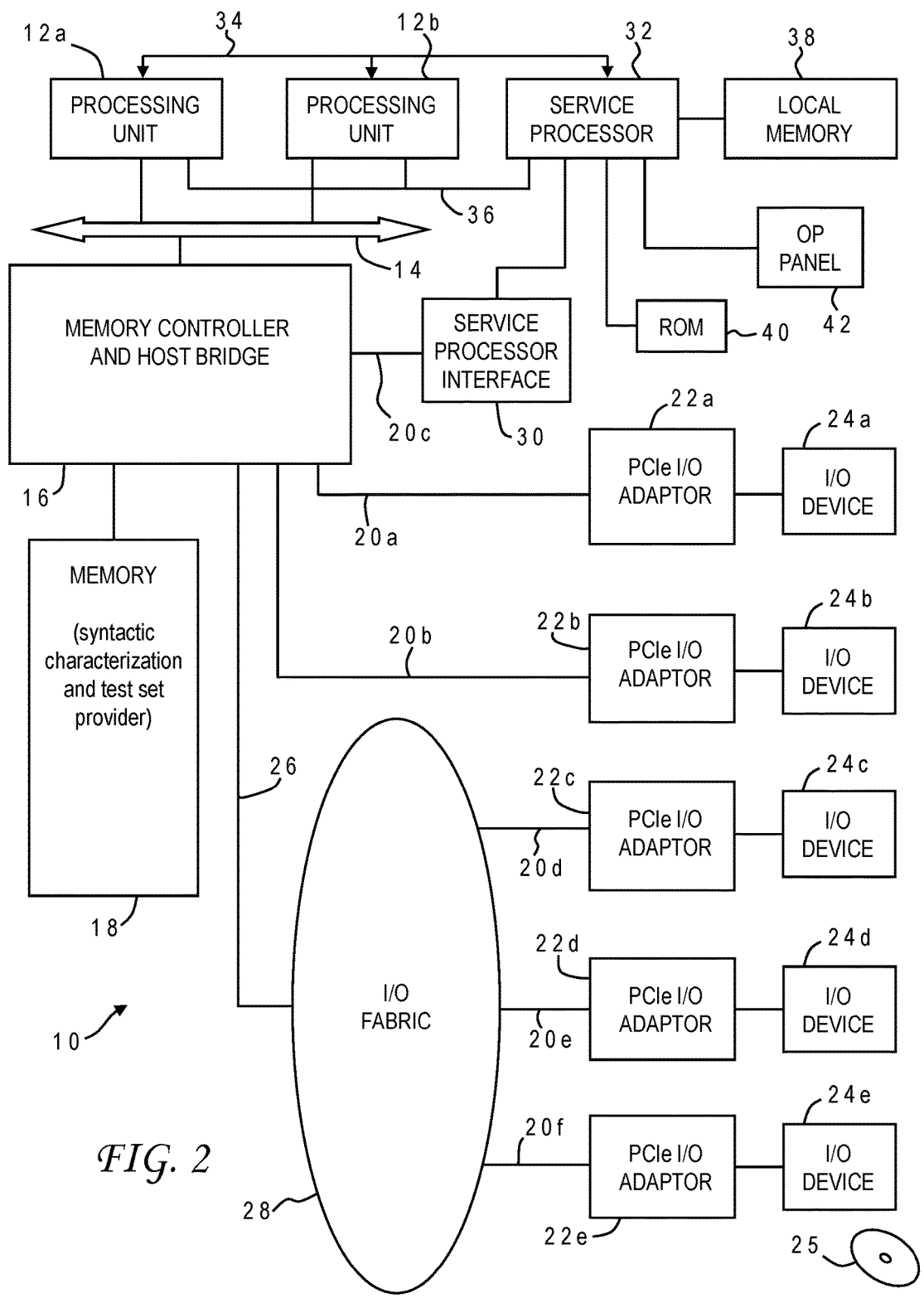
FIG. 2 is a block diagram of a computer system programmed to carry out syntactic characterization and test set creation in accordance with one implementation of the present invention.

With reference now to the figures, and in particular with reference to FIG. 2, there is depicted one embodiment 10 of a computer system in which the present invention may be implemented to carry out syntactic characterization of natural language sentences and creation of sentence test sets for use with a deep question answering system. Computer system 10 is a symmetric multiprocessor (SMP) system having a plurality of processors 12a, 12b connected to a system bus 14. System bus 14 is further connected to and communicates with a combined memory controller/host bridge (MC/HB) 16 which provides an interface to system memory 18. System memory 18 may be a local memory device or alternatively may include a plurality of distributed memory devices, preferably dynamic random-access memory (DRAM). There may be additional structures in the memory hierarchy which are not depicted, such as on-board (L1) and second-level (L2) or third-level (L3) caches. System memory 18 has loaded therein a syntactic characterization application in accordance with the present invention.

MC/HB 16 also has an interface to peripheral component interconnect (PCI) Express links 20a, 20b, 20c. Each PCI Express (PCIe) link 20a, 20b is connected to a respective PCIe adaptor 22a, 22b, and each PCIe adaptor 22a, 22b is connected to a respective input/output (I/O) device 24a, 24b. MC/HB 16 may additionally have an interface to an I/O bus 26 which is connected to a switch (I/O fabric) 28. Switch 28 provides a fan-out for the I/O bus to a plurality of PCI links 20d, 20e, 20f. These PCI links are connected to more PCIe adaptors 22c, 22d, 22e which in turn support more I/O devices 24c, 24d, 24e. The I/O devices may include, without limitation, a keyboard, a graphical pointing device (mouse), a microphone, a display device, speakers, a permanent storage device (hard disk drive) or an array of such storage devices, an optical disk drive which receives an optical disk 25 (one example of a computer readable storage medium) such as a CD or DVD, and a network card. Each PCIe adaptor provides an interface between the PCI link and the respective I/O device. MC/HB 16 provides a low latency path through which processors 12a, 12b may access PCI devices mapped anywhere within bus memory or I/O address spaces. MC/HB 16 further provides a high bandwidth path to allow the PCI devices to access memory 18. Switch 28 may provide peer-to-peer communications between different endpoints and this data traffic does not need to be forwarded to MC/HB 16 if it does not involve cache-coherent memory transfers. Switch 28 is shown as a separate logical component but it could be integrated into MC/HB 16.

In this embodiment, PCI link 20c connects MC/HB 16 to a service processor interface 30 to allow communications between I/O device 24a and a service processor 32. Service processor 32 is connected to processors 12a, 12b via a JTAG interface 34, and uses an attention line 36 which interrupts the operation of processors 12a, 12b. Service processor 32 may have its own local memory 38, and is connected to read-only memory (ROM) 40 which stores various program instructions for system startup. Service processor 32 may also have access to a hardware operator panel 42 to provide system status and diagnostic information.

In alternative embodiments computer system 10 may include modifications of these hardware components or their interconnections, or additional components, so the depicted example should not be construed as implying any architectural limitations with respect to the present invention. The invention may further be implemented in an equivalent cloud computing network.

When computer system 10 is initially powered up, service processor 32 uses JTAG interface 34 to interrogate the system (host) processors 12a, 12b and MC/HB 16. After completing the interrogation, service processor 32 acquires an inventory and topology for computer system 10. Service processor 32 then executes various tests such as built-in-self-tests (BISTs), basic assurance tests (BATs), and memory tests on the components of computer system 10. Any error information for failures detected during the testing is reported by service processor 32 to operator panel 42. If a valid configuration of system resources is still possible after taking out any components found to be faulty during the testing then computer system 10 is allowed to proceed. Executable code is loaded into memory 18 and service processor 32 releases host processors 12a, 12b for execution of the program code, e.g., an operating system (OS) which is used to launch applications and in particular the syntactic classification application of the present invention, results of which may be stored in a hard disk drive of the system (an I/O device 24). While host processors 12a, 12b are executing program code, service processor 32 may enter a mode of monitoring and reporting any operating parameters or errors, such as the cooling fan speed and operation, thermal sensors, power supply regulators, and recoverable and non-recoverable errors reported by any of processors 12a, 12b, memory 18, and MC/HB 16. Service processor 32 may take further action based on the type of errors or defined thresholds.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Computer system 10 carries out program instructions for a classification (i.e., labeling) process that uses novel analysis techniques to characterize syntactic and semantic relationships in a natural language sentence. In addition to these novel aspects, a program embodying the invention may include conventional aspects of various parsing tools, and these details will become apparent to those skilled in the art upon reference to this disclosure.

Figure 1:
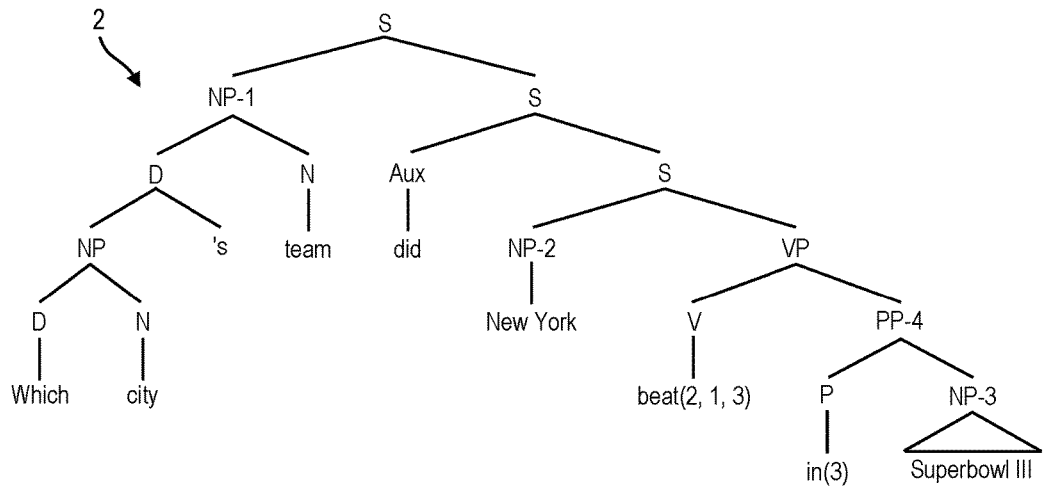
FIG. 1 is an example of a conventional constituency-based parse tree for a natural language sentence, in this case, an interrogative sentence (question)
Figure 3:
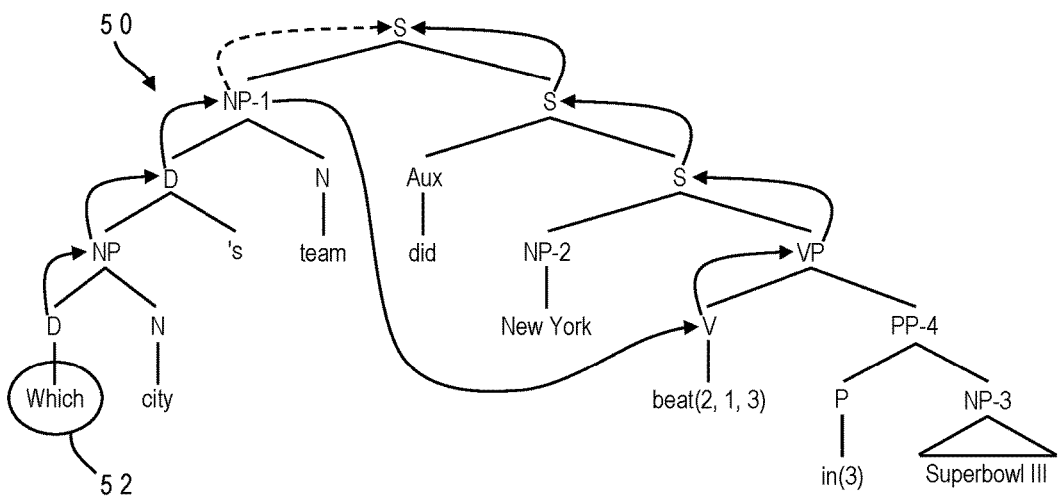
FIG. 3 is the parse tree of FIG. 1 showing how syntactic information can be extracted from a sentence to create a sequentialization label in accordance with one implementation of the present invention.

Referring now to FIG. 3, there is depicted one example of how a natural language sentence can be analyzed by computer system 10 in accordance with the present invention to generate a syntactic classification. The depicted analysis identifies grammatical structures and semantic roles of an input question, returning a tree-like graph (parse tree) representing the syntactic constituent structure and the semantic argument structure of the sentence, with dominance indicating constituency and node labels encoding predicate/argument structure. FIG. 3 uses the same sentence from FIG. 1 having a parse tree 50 which can be stored as a data structure within computer system 10, but now additionally showing a traversal path along the parse tree as indicated by the curved arrows leading from one node of the tree to another. In this representation numeric values in the linguistic identifiers indicate semantic arguments, and elements with parentheses indicate semantic roles those arguments are playing (the label "beat(2,1,3)" indicates that "2" ("New York") is the agent of the beating, that "1" ("which city's team") is the patient and "3" ("in Superbowl III") is the location).

For this example, the element of interest in the sentence is an interrogative element, the word "Which". Other elements of interest may be designated either manually or automatically for this and other sentences, particularly other interrogative elements ("wh-" words) such as "who", "what", "when", "how", "where" and "why", or dialectic equivalents. Further in this regard, it is understood that the statement in FIG. 3 is a "question", but this question is still generally considered to be a "sentence" as that term is used herein; specifically, it is an interrogative sentence. The present invention is more generally applicable to any sentence type or partial sentence including, without limitation, the identity and declarative sentences described below in conjunction with FIGS. 4 and 5.

According to a simpler implementation of the present invention, the traversal path begins at the location in the parse tree corresponding to the element of interest, and moves directly up the tree toward the root to create a sequentialization of a specific subpart of the parse tree, i.e., a list of node labels or other relevant information, in order of the traversal. The node in the parse tree corresponding to the questioned element can be identified in various manners, such as scanning the parse-tree for the element in a top-down, left-to-right, depth-first fashion (other scanning methodologies can be employed). Thus, the first node recorded for the traversal sequence in this example is the "D" associated with the node 52 of the distinguished element "Which". The next node in the sequence is "NP" (for the noun phrase which includes "Which" and "city"), then another "D" (for the possessive determiner "'s" in combination with the noun phrase), and then another "NP" (NP-1, for the noun phrase which additionally includes "team"). For this simpler implementation, the final node of the sequence is the "S" at the root (as indicated by the dashed arrow in FIG. 3). Thus, the complete sequence for this sentence might be <D, NP, D, NP, S>. This sequentialization label (the record of the traversal) becomes the formal classification for the sentence.

The particular traversal scheme used can vary considerably according to different implementations of the present invention. In one alternative implementation, if during the traversal a node is traversed which has a linguistic identifier with a semantic argument numeric index n (for example in "NP-1", n=1), then the traversal path might experience a discontinuous jump along the parse tree. Computer system 10 can scan the parse tree (as above) to identify a node with a linguistic identifier indicating that the semantic argument index n fills a semantic role of that indexed node; if such a node is found and has not already been traversed, then the traversal continues toward the root from that node. Otherwise, the traversal continues toward the root from the current node (the node with the semantic argument numeric index n). Referring again to FIG. 3, this alternative implementation would result in the traversal path jumping from the "NP-1" node (the noun phrase which includes "team") to the "V" node corresponding to "beat", because the word "beat" has a semantic argument which includes the referenced index (1). Continued traversal of the tree towards the root continues from this "V" node yielding a final sequentialization label for the sentence of <D, NP, D, NP, V, VP, S, S, S>.

The labels so derived for a group of different sentences can be used to measure the grammatical diversity of the group. One such measure of diversity is the entropy measure. This measure relates to the number and distribution of labels in the group, with a group whose sentences whose labels are evenly distributed among the sentences more diverse than a group of sentences which all have a single label, or whose sentences are unevenly distributed. In the case that group of sentences is collected to be used as a training set for a deep question answering system, if the group is found to be low in entropy (not diverse), additional collection can be undertaken to find a broader range of sentences types. In the extreme case, if the labels for some sentences are the same or too similar (as discussed further below), they can be excluded from a final training set of sentences to be used for training the deep question answering system. For example, if the same traversal scheme discussed in the preceding paragraph were used, the sentence "Which man's wife did John invite to the party?" would be given the same sequentialization label of <D, NP, D, NP, V, VP, S, S, S> as the first sentence from the FIG. 3 (which has already been placed in the training set). This latter sentence could thus be omitted from the final training set as it does not add any significant grammatical diversity beyond the first sentence, or additional sentences could be collected to improve the diversity score.

Figure 4:
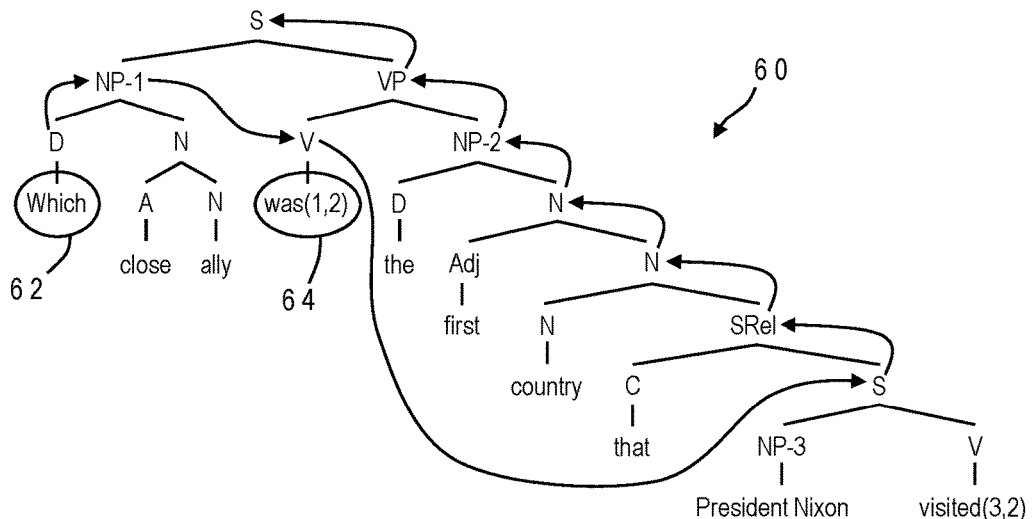
FIG. 4 is a parse tree for an identity sentence showing how syntactic information can be extracted in accordance with one implementation of the present invention.

A wide variety of other traversal schemes can be used consistent with the present invention. FIG. 4 illustrates how another embodiment of the invention might add additional complexity to the parse-tree traversal scheme. According to this implementation, if a node reached in the traversal is labeled with a form of the verb "to be" ("am", "are", "is", "was", "were", "be", "being", "been", or dialectic equivalents) which has two semantic roles (n, m), n being a semantic role representing a subject, and m being a semantic role representing an object, then computer system 10 scans the parse tree to identify a node with a linguistic identifier indicating that the semantic argument index m fills a semantic role of that identified node. If such a node is found and has not already been traversed, then the traversal continues toward the root from that node. Otherwise, the traversal continues toward the root from the current node (the "to be" verb). This implementation would provide a more articulated label in many cases. For example, in the parse tree 60 for the sentence "Which close ally was the first country that President Nixon visited?" illustrated in FIG. 4 with a starting node 62 at "Which", the sequentialization label would be <D, NP, V, S, SRel, N, N, NP, VP, S>. The traversal path jumps from the "to be" verb "was(1,2)" at node 64 to the sentence fragment composed of "President Nixon" and "visited(3,2)".

Figure 5:
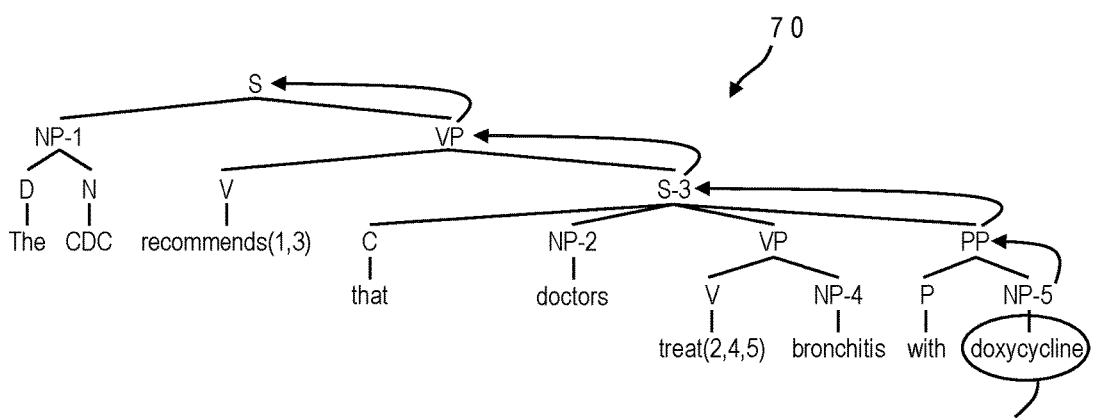
FIG. 5 is a parse tree for a declarative sentence showing how syntactic information can be extracted in accordance with one implementation of the present invention.

Another embodiment of the invention might be used to classify (a set of) declarative sentences (assertions) with respect to a designated entity of another sort besides an interrogative element. For example, it might be of interest to classify the assertions in a corpus of medical abstracts with respect to a particular concept, such as the name of a particular drug. This analysis is shown in FIG. 5 for the drug "doxycycline". Computer system 10 again scans the parse tree to identify a node corresponding to the distinguished element "doxycycline" by scanning the parse tree in a top-down, left-to-right, depth-first fashion. The sentence "The CDC recommends that doctors treat bronchitis with doxycycline" having the parse tree 70 seen in FIG. 5 with starting node 72 would then be assigned the label <NP, PP, S, VP, S> with respect to the distinguished element "doxycycline" using the method of this invention.

The foregoing traversal schemes are merely examples of a variety of schemes that may be implemented and should not be construed in a limiting sense. Traversal schemes may include other variations besides discontinuous jumps, such as skipping (omitting) certain types of nodes, temporary movement away from the root instead of toward it, etc. The illustrated parse trees are constituency-based parse trees but this aspect of the example should also not be construed in a limiting sense. Dependency-based parse trees can be used as well. More generally, the present invention can be applied to any type of parse tree or "arranger" of sentences that allows for deterministic traversal of the arrangement of linguistic elements. Of course, more complicated traversal schemes may require other features such as an indication in the parse structure of the logical or semantic relations (e.g., who did what to whom) or some notion of a word being a part of a larger structure. The invention could be implemented without including the root node in the sequence, but some node should be designated as the final node to ensure the traversal algorithm comes to a halt.

Those skilled in the art will appreciate that what is being captured intuitively by the label is a record of all the syntactic/semantic relations that the targeted element is involved in. This aspect of at least some embodiments of the invention may be understood with reference to the following two sentences:

"Who did the man that my mother talked to take to the party down the street?"

"Who did Jim take home?"

While these sentences are very different syntactically (their parse trees are quite distinct), if they are considered solely with regard to the thing that is being questioned ("who"), they are practically the same; both have the same sequentialization label <D, Aux, S, S>. All of the complexity is related to other parts of the sentences, i.e., parts that are not directed related to "who".

One application of the present invention is the characterization of the grammatical diversity of a set of sentences with respect to a targeted element, to assure proper coverage for a deep question answering system. The invention allows a designer to build a set of natural language sentences that is appropriately diverse. The set may any one of a number of different types of sets that are used in conjunction with a deep question answering system, such as a training set, a validation set, or a test set. Those skilled in the art understand that the functions of these three sets are different. A training set is used to help form the basis of the system's logic, e.g., adjust the weightings on the neural network. A validation set is used to minimize overfitting, i.e., not adjusting the weightings of the network but just verifying accuracy over the training data. A test set is used only for evaluation of the final system setup in order to confirm the actual predictive power of the network. While these terms can thus denote different uses, the present invention is equally applicable to any of them, and all of these types of sets, as well as others, are contemplated by the term "test set" as used herein.

Figure 6:
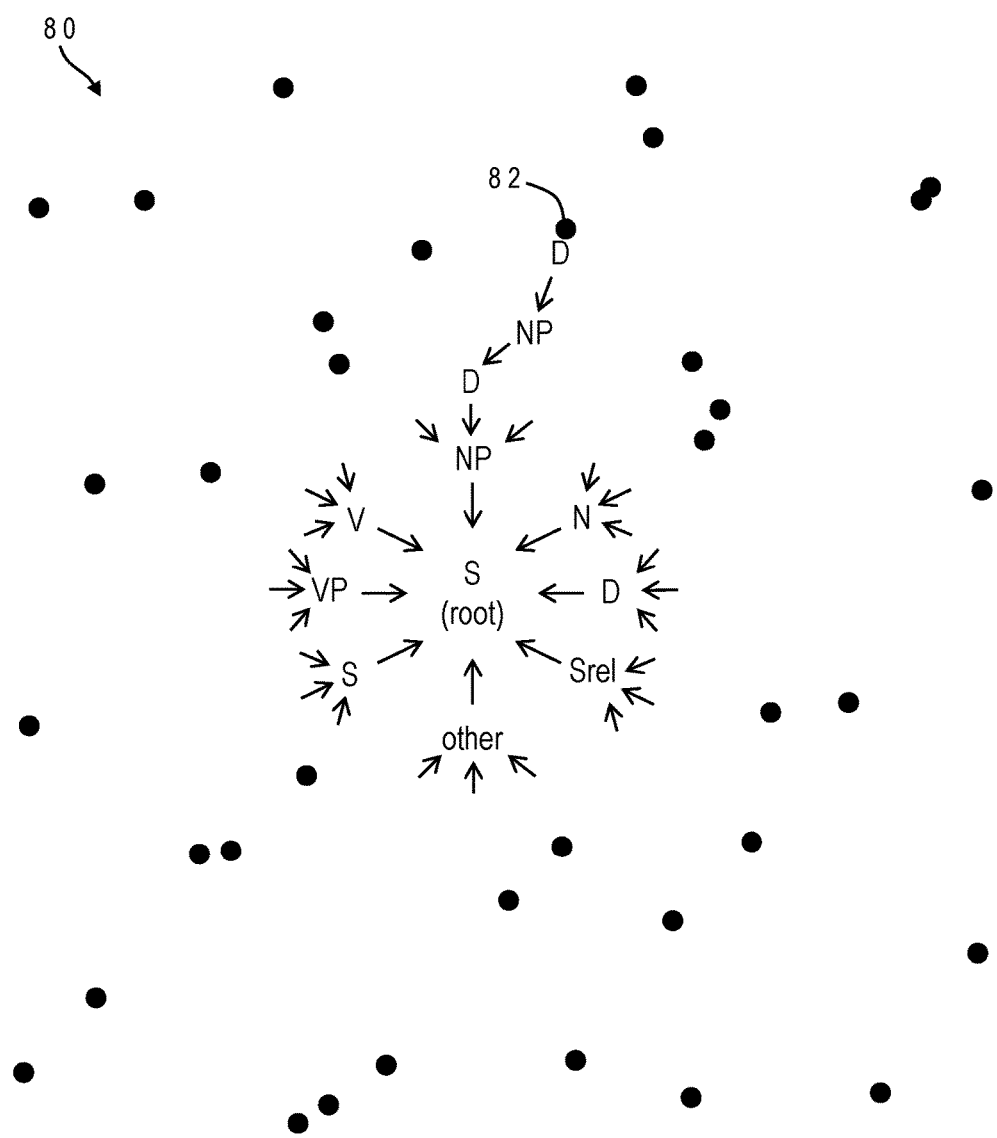
FIG. 6 is a pictorial representation of a syntactic space composed of a variety of syntactic classification labels with an illustrative distribution symbolizing the grammatical diversity of a test set of natural language sentences in accordance with one implementation of the present invention.

The present invention can accordingly be used to build a test set that has sufficient grammatical diversity by selecting a suitable set of natural language sentences according to a desired syntactic distribution. For any given parsing methodology, there is a syntactic space defined by all possible (allowed) sequences of linguistic elements. FIG. 6 shows a symbolic representation of one such syntactic space 80 for a parse tree that uses elements similar to those previously disclosed. According to this specific example, each syntactic classification (label) in the space 80 ends with the root node "S", and the node preceding this last sequential element can be any of "N", "NP", "V", "VP", "S", "Srel", "D", or some other linguistic identifier. Each of those nodes can itself be preceded by another particular linguistic identifier, etc., leading backward to some starting point specified by the complete sequentialization label. Each dot in FIG. 6 represents one such starting point for different sentences. For example, point 82 in FIG. 6 represents the sequentialization label <D, NP, D, NP, S>.

Thus, the locations of the dots in FIG. 6 represent a syntactic distribution that is reflective of a particular set of sentences deemed to be different (or sufficiently different) in terms of syntax. This distribution is diverse in the sense that the dots are relatively spread out, i.e., not mostly clumped in one area. The test set designer can provide various definitions or criteria for similarity, i.e., a second sentence might be excluded from a test set based on a first sentence that is already in the test set according to certain rules. For example, a sentence could be deemed similar (and hence, excluded from the test set) even though its sequentialization label is unique if it has only one (or two) elements not present that were present in another sentence (or has one or two elements present that were not present in another sentence). A different syntactic distribution would arise if sentences were deemed to be similar when certain elements can be substituted, e.g., N for NP or vice-versa. A minimum number of total differently classified sentences in the set can be predetermined by the designer. An explicit distribution can be provided by manually specifying certain sequentialization labels, or partial labels. The designer may decide to allow multiple sentences having the exact same label subject to some predetermined maximum number of such sentences, e.g., up to ten sentences that are somehow different in wording but all have the same syntactic classification label according to the particular scheme being used. Weightings can be applied by allowing some sentence types to appear more frequently than others, i.e., some labels may be considered rare or very rare.

Figure 7:
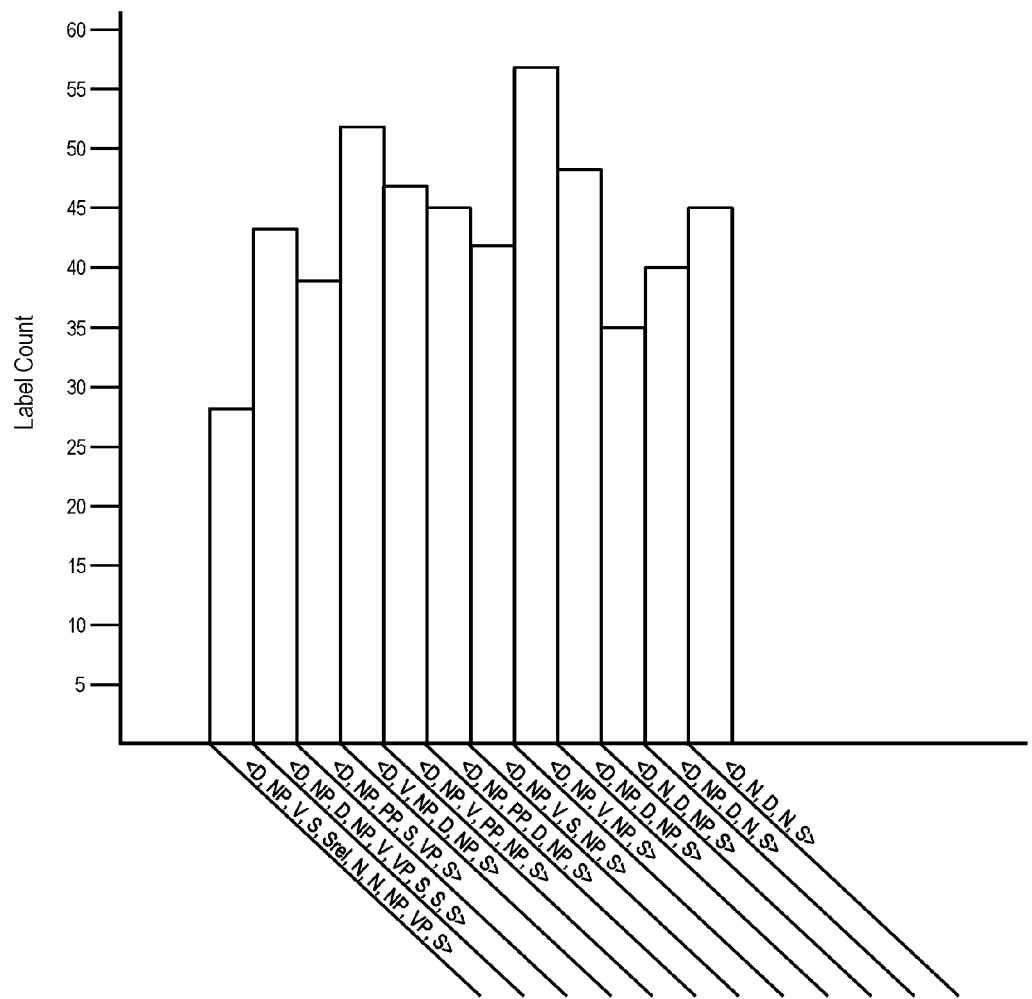
FIG. 7 is a histogram showing a desired statistical distribution of different sentences based on syntax classifications in accordance with one implementation of the present invention.

The notion of syntactic diversity may also refer to a distribution as that term is understood in probability and statistics. It might be expected that there would be many different sentences in the training set (in actual practice it could be tens of thousands of sentences). It might further be expected that although each of these sentences is unique, many of them will have the same syntax label (in actual practice, the number of different labels could be in the tens or hundreds). A diverse set will be one in which the labels are "evenly" distributed. A non-diverse distribution is one in which the counts are skewed (in the extreme case all the items having the same label). A set may be considered acceptable based on different criteria, e.g., the counts for each label are within some percentage of each other or within some absolute number of counts. FIG. 7 shows a histogram for a training set that might be considered acceptable according to a desired distribution for an interrogative element of interest (hence each label begins with "D"). In this example, there are twelve different labels across a total of 475 different sentences. If a training set is initially formed that does not have an even distribution, more collecting can be done, or if the set has an extremely large number of sentences having one or two specific labels then some of those sentences could be culled, manually or in an automated fashion.

Figure 8:
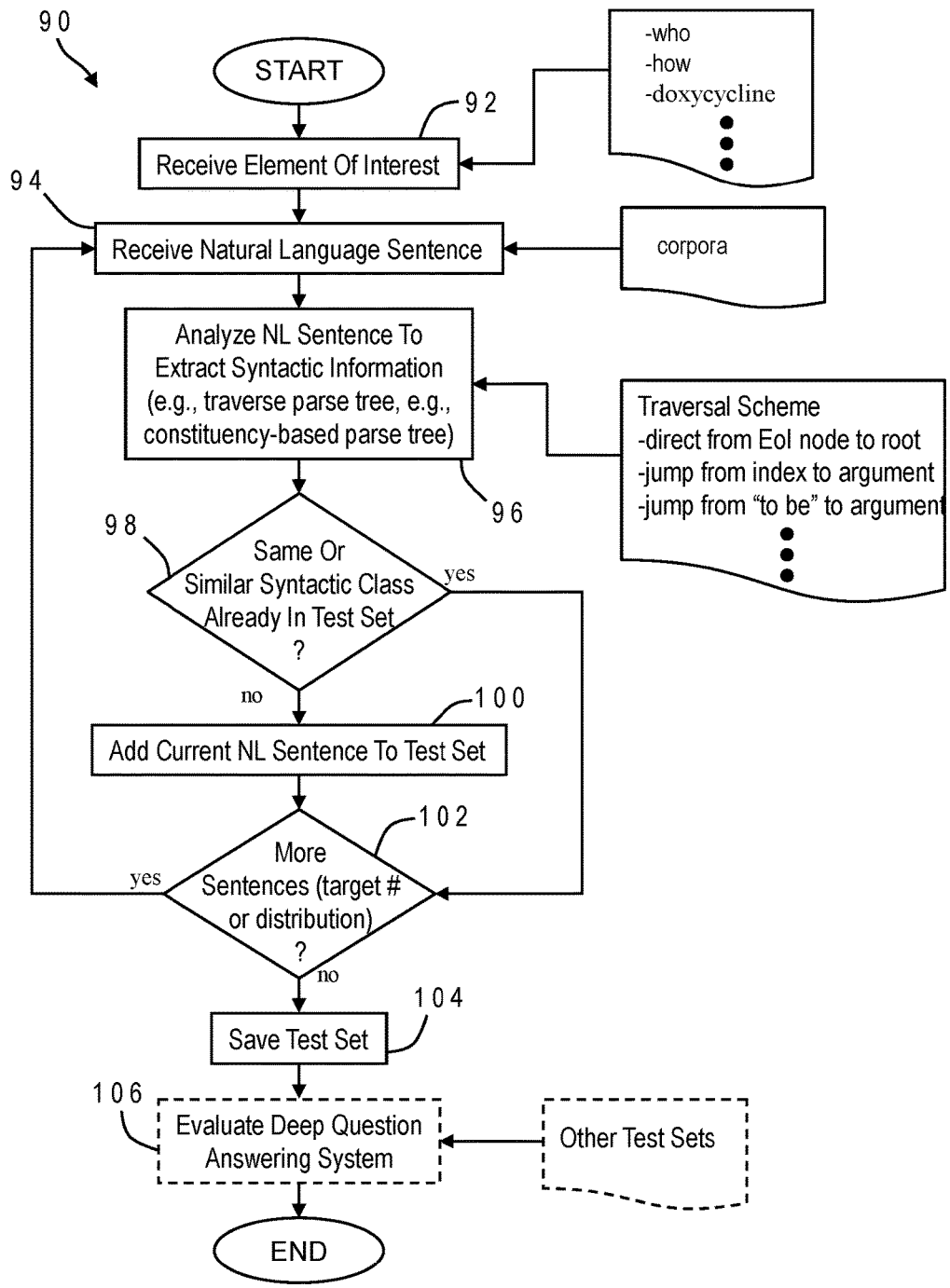
FIG. 8 is a chart illustrating the logical flow for a sentence classification and test set generation process in accordance with one implementation of the present invention.

The present invention may be further understood with reference to the chart of FIG. 8 which illustrates the logical flow for a sentence classification and test set generation process in accordance with one implementation of the present invention. The process for this implementation begins by receiving the element of interest, e.g., an interrogative element ("wh-" word) or desired topic (92). The element of interest may be specified by the test set designer or may be automatically selected as part of a broader process involving multiple test sets. A candidate natural language (NL) sentence is then received (94). The sentence may come from one or more corpora, manually provided in a computer-readable form, or found via an automated process such as web crawling (parsing various Internet web pages). The NL sentence is analyzed to extract syntactic information (96). The syntactic information may be in the form of a sequentialization label obtained via a traversal scheme for a parse tree of the NL sentence. The resulting label is compared to other labels already in the test set (98). If the same or similar syntactic class is already in the test (and/or a maximum number of sentences having that label are already in the test set), then the current NL sentence is discarded; if not, the current NL sentence is added to the test set (100). A check is then made to see if more sentences should be processed (102). This check may be based whether the desired distribution has been reached, or a target number of sentences being included in the test set, or other termination criteria such as the corpora simply running out of additional sentences. If more sentences are to be processed, the process continues at box 94. Once all sentences have been processed, the test set is saved, i.e., as a computer file within computer system 10 (104). Thereafter, the test set may be used to evaluate a deep question answering system (106), which evaluation may further include additional test sets for other elements of interest and/or different corpora.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A method of providing a test set of natural language sentences for a deep question answering system comprising:
   receiving a plurality of natural language sentences in computer-readable form wherein each natural language sentence has a composition of certain words, by executing first instructions in a computer system;
   analyzing the natural language sentences to characterize different syntactical classifications of the sentences, by executing second instructions in the computer system;
   selecting a subset of the natural language sentences according to a desired syntactic distribution based on the different syntactical classifications wherein each natural language sentence in the subset is unchanged from its composition, by executing third instructions in the computer system;
   storing the selected subset as the test set, by executing fourth instructions in the computer system;

applying the test set to the deep question answering system to train the deep question answering system, by executing fifth instructions in the computer system;

receiving a query from a user, by executing sixth instructions in the computer system;

using the deep question answering system to generate an answer to the query, by executing seventh instructions in the computer system; and presenting the answer to the user, by executing eighth instructions in the computer system.

2. The method of claim 1 wherein said selecting includes:
determining that a syntactical classification for a candidate natural language sentence is different from syntactical classifications of other natural language sentences already in the subset according to at least one predetermined similarity criterion; and
responsive to said determining, adding the candidate natural language sentence to the subset.

3. The method of claim 1 wherein said selecting provides a predetermined minimum number of differently classified sentences in the subset.

4. The method of claim 1 wherein said selecting allows multiple sentences having the exact same syntactical classification in the subset subject to a predetermined maximum number.

5. The method of claim 1 wherein the test set is adapted to an element of interest by characterizing each syntactical classification relative to a location of the element of interest in a respective one of the natural language sentences.

6. The method of claim 5 wherein said analyzing includes:
parsing a given one of the natural language sentences to derive a parse tree having a plurality of nodes;
identifying a particular one of the nodes that corresponds to the element of interest;
extracting syntactic information from the parse tree relative to particular node corresponding to the element of interest; and
recording the syntactic information as the classification.

7. A computer system comprising:
one or more processors which process program instructions;
a memory device connected to said one or more processors; and
program instructions residing in said memory device for providing a test set of natural language sentences for a deep question answering system by receiving a plurality of natural language sentences wherein each natural language sentence has a composition of certain words, analyzing the natural language sentences to characterize different syntactical classifications of the sentences, selecting a subset of the natural language sentences according to a desired syntactic distribution based on the different syntactical classifications wherein each natural language sentence in the subset is unchanged from its composition, storing the selected subset as the test set, applying the test set to the deep question answering system to train the deep question answering system, receiving a query from a user, using the deep question answering system to generate an answer to the query, and presenting the answer to the user.

8. The computer system of claim 7 wherein said program instructions further determine that a syntactical classification for a candidate natural language sentence is different from syntactical classifications of other natural language sentences already in the subset according to at least one predetermined similarity criterion, and responsively adds the candidate natural language sentence to the subset.

9. The computer system of claim 7 wherein the selecting provides a predetermined minimum number of differently classified sentences in the subset.

10. The computer system of claim 7 wherein the selecting allows multiple sentences having the exact same syntactical classification in the subset subject to a predetermined maximum number.

11. The computer system of claim 7 wherein the test set is adapted to an element of interest by characterizing each syntactical classification relative to a location of the element of interest in a respective one of the natural language sentences.

12. The computer system of claim 11 wherein the analyzing includes:
parsing a given one of the natural language sentences to derive a parse tree having a plurality of nodes;
identifying a particular one of the nodes that corresponds to the element of interest;
extracting syntactic information from the parse tree relative to particular node corresponding to the element of interest; and
recording the syntactic information as the classification.

13. A computer program product comprising:
a computer readable storage medium; and
program instructions residing in said storage medium for providing a test set of natural language sentences for a deep question answering system by receiving a plurality of natural language sentences wherein each natural language sentence has a composition of certain words, analyzing the natural language sentences to characterize different syntactical classifications of the sentences, selecting a subset of the natural language sentences according to a desired syntactic distribution based on the different syntactical classifications wherein each natural language sentence in the subset is unchanged from its composition, storing the selected subset as the test set, applying the test set to the deep question answering system to train the deep question answering system, receiving a query from a user, using the deep question answering system to generate an answer to the query, and presenting the answer to the user.

14. The computer program product of claim 13 wherein said program instructions further determine that a syntactical classification for a candidate natural language sentence is different from syntactical classifications of other natural language sentences already in the subset according to at least one predetermined similarity criterion, and responsively adds the candidate natural language sentence to the subset.

15. The computer program product of claim 13 wherein the selecting provides a predetermined minimum number of differently classified sentences in the sub set.

16. The computer program product of claim 13 wherein the selecting allows multiple sentences having the exact same syntactical classification in the subset subject to a predetermined maximum number.

17. The computer program product of claim 13 wherein the test set is adapted to an element of interest by characterizing each syntactical classification relative to a location of the element of interest in a respective one of the natural language sentences.

18. The computer program product of claim 17 wherein the analyzing includes:
parsing a given one of the natural language sentences to derive a parse tree having a plurality of nodes;
identifying a particular one of the nodes that corresponds to the element of interest;

extracting syntactic information from the parse tree relative to particular node corresponding to the element of interest; and recording the syntactic information as the classification.

* * * * *